United States Patent [19]

Ishikawa et al.

[11] 3,829,602

[45] Aug. 13, 1974

[54] LAMINATED SHIELD TAPE FOR CABLE AND LAMINATE SHEATHED CABLE FORMED BY USING THE LAMINATED SHIELD TAPE

[75] Inventors: Hisao Ishikawa; Terutsugu Kawabata, all of Tokyo, Japan

[73] Assignee: Fujikura Cable Works Ltd., Tokyo, Japan

[22] Filed: Jan. 4, 1973

[21] Appl. No.: 321,096

[52] U.S. Cl............ 174/102 R, 29/471.1, 138/155, 156/54, 219/83, 242/59
[51] Int. Cl. .............................................. H01b 7/18
[58] Field of Search................ 174/36, 102 R, 107; 29/191.6, 193, 470.1, 484, 471.1, 469, 428, 630 F, 628, 185, 193.5, 470.3; 156/52, 53, 54; 138/154, 155; 242/58.1, 59; 219/9.5, 10.53, 10.61, 83, 86, 87, 91

[56] References Cited
UNITED STATES PATENTS
1,990,738  2/1935  La Porte.......................... 219/91 X
2,957,976  10/1960  Green................................ 219/91 X
3,141,949  7/1964  Lovell............................... 219/91 X
3,242,306  3/1966  Dallas et al. ......................... 219/91
3,640,556  2/1972  Bennett............................. 219/91 X
3,666,912  5/1972  Anderson et al. .................. 219/91 X
3,674,976  7/1972  Bitko .................................... 219/91

*Primary Examiner*—A. T. Grimley
*Attorney, Agent, or Firm*—Sughrue, Rothwell, Mion, Zinn & Macpeak

[57] ABSTRACT

A laminated tape for shielding cable composed of at least two metallic strips which have been connected to each other by welding at the end portions in the longitudinal direction and a plastic film coated on at least one surface of the metallic strip, the width of the overlapped or abutting weld portion of the ends of the metallic strips being less than about 10mm., the interval of the weld points formed in the overlapped or abutting portion by welding being less than about 5 mm., and the angle of the weld line to the longitudinal direction of the metallic strip being in a range of about 30° to about 80°. A laminate sheathed cable formed using the laminate shield tape.

16 Claims, 5 Drawing Figures

LAMINATED SHIELD TAPE FOR CABLE AND LAMINATE SHEATHED CABLE FORMED BY USING THE LAMINATED SHIELD TAPE

BACKGROUND OF THE INVENTION

1. Field of the Invention

The present invention relates to a laminated tape for shielding cable composed of at least two metallic strips which have been connected to each other at an improved welded portion in the longitudinal direction and have a plastic film coated on at least one surface thereof. The invention further relates to a laminate sheathed cable formed using the aforesaid laminated shield tape.

2. Description of the Prior Art

An electrical cable with a laminated shield tape is generally composed of conductive cable cores, a laminated shield tape consisting of a metallic strip having coated thereon a plastic film generally having high chemical and moisture resistance, the laminated shield tape folded about the cable cores with the plastic film outside, and an outer protective plastic sheath formed over the laminated shield tape by extrusion. Because such laminate sheathed cables have excellent moisture resistance and excellent mechanical properties they have recently come into wide use.

However, since a metallic strip, such as an aluminum strip, comprising the laminated shield tape has a limited length, it is necessary, to obtain a metallic strip longer than the cable core length, to connect metallic strips during the production of the laminated shield tape or to connect laminated shield tapes after the production thereof.

The connection of metallic strips has hitherto been conducted by connecting the ends of the segments of metallic strips by a spot welding method or a cold pressing method, but the connected portion formed by such a method is present in the laminate sheathed cable and the mechanical properties of the cable are degraded (it is required to use a cable having a length corresponding to the length of the metallic strip so that the connected portion is not in the cable). Therefore, if it were possible to obtain an excellent connected portion without degrading the mechanical properties of a laminate sheathed cable even if the connected portion is present in the cable, a laminate sheathed cable having a desired length could be produced without being affected by the length of the metallic strip.

It has also been confirmed that when metallic strips having connected portions obtained by a spot welding or cold pressing method as mentioned above are used as a metallic tape for shielding cable the mechanical properties of the cable may be satisfied to some extent, but when a laminated shield tape composed of such connected metallic strips having coated thereon a plastic film such as a polyethylene film is used for the same purpose in such manner that the connected portions are present in the cable, they degrade the cable at their positions with respect to the mechanical properties of cable, in particular, the bending property, the rubbing property, the low-temperature impact falling property, the low-temperature impact bending property, etc.

SUMMARY OF THE INVENTION

The inventors have investigated forming improved connected portions of metallic strips which do not degrade the mechanical properties of a laminate sheathed cable even when the metallic strips are coated with a plastic film and the connected portion or portions are present in the cable, and as a result thereof discovered that when the connection portion or portions are formed under specific conditions, the laminated shield tape composed of the connected metallic strips and a plastic film coated thereon can be used satisfactorily for making cable, even if the connected portion is present in the cable.

That is, according to the present invention there is provided a laminated tape for shielding cable which is composed of at least two metallic strips connected at the end portions thereof in the longitudinal direction, which metallic strips have a plastic film coated on one surface or both surfaces thereof, the width of the overlapped or abutting portion of the connection ends of the metallic strips being less than about 10 mm, the interval of the weld points of the overlapped portion being less than 5 mm, and the angle of the weld line to the longitudinal direction of the metallic strip being in the range of about 30° to about 80°.

The invention also provides a laminate sheathed cable composed of conductive cable cores, the aforesaid laminated shield tape folded about the cores with the plastic film outside, and a protective jacket of a corrosion resisting polymer covering the laminated tape.

DETAILED DESCRIPTION OF THE INVENTION

As is shown in the various figures of the accompanying drawings, the connected portion of the laminated tape for shielding cable according to this invention has the features that the width (W) of the piled portion of the connected ends of the metallic strips 1 and 2 is less than about 10 mm., the interval ($p$) of weld points 4 of the connected portion 3 formed in the overlapped portion is less than about 5 mm., and the connection angle ($\theta$) of the weld line to the longitudinal direction of the metallic strip is in a range of about 30° to about 80°.

The numerical conditions of this invention apply to any metallic strip regardless of the width and thickness thereof. If the width (W) of the overlapped portion of the metallic strips or the angle ($\theta$) of the connected portion is larger than the above-defined values, the bending property is reduced, and if the interval ($p$) of the weld points is larger than the above-mentioned value, the necessary connection strength at the connected portion is not obtained. Thus, by satisfying the aforesaid conditions of this invention an excellent connected portion of metallic strips for making laminate sheathed cable is obtained. The importance of the above values of the width (W) and the angle ($\theta$) will become clear from Experiments I–III described below.

For welding the metallic strips, a welding method such as resistance welding, ultrasonic welding or arc welding is employed in this invention, and as the resistance welding method there can be used a spot welding method giving weld spots arranged at an interval from each other and a seam welding method giving continuously or discontinuously welded spots with a pitch ($p$) of 0 to 5 mm. In particular, in the case of employing seam welding, a so-called foil seam welding method wherein the connection ends of two metallic strips 1 and 2 are brought into contact each other is applicable, and in this case the width (W) is zero. That is, the width of the piled portion of connection ends defined in this invention includes 0 mm, when the two metallic strips may be considered abutting rather than overlapping.

The invention will now be further explained by several Examples with reference to the accompanying drawings.

Figure 1:
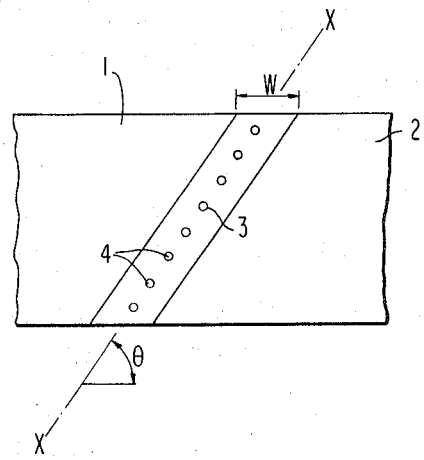
FIG. 1 is a schematic front view showing a practical embodiment of the connected portion of metallic strips according to this invention.

In the Example shown in FIG. 1, the connection ends of two metallic strips 1 and 2 are piled or overlapped on each other with a width (W) of the piled or overlapped portion within the scope of this invention and with an angle ($\theta$) also within the scope of this invention. Weld portions 3 are formed along the line of the piled portion having an angle ($\theta$) to the longitudinal direction of the metallic strip by a spot welding method.

Figure 3:
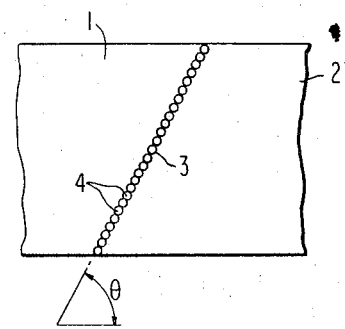
FIG 3, FIG. 4 and FIG. 5 are schematic front views showing different embodiments of the connected portion of metallic strips according to this invention.
Figure 4:
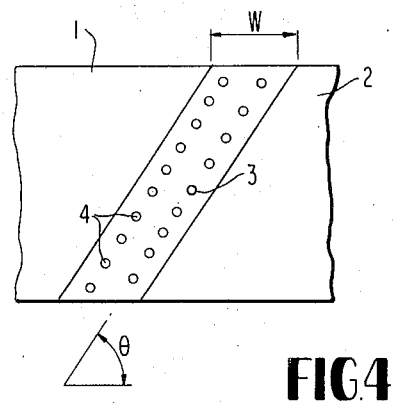

In the Example shown in FIG. 3, the connection end of a metallic strip 1 is brought into contact or abutted with the connection end of a metallic strip 2 with an angle ($\theta$) within the scope of this invention and weld portions 3 are formed in the contact line by a foil seam welding method. The Example shown in FIG. 4 is a modification of the connected portion shown in FIG. 1, that is, in this embodiment two parallel weld portions 3 and 3 are formed in the piled or overlapped portion of metallic strips 1 and 2 by spot welding. If desired, three or more parallel welds may be formed.

Figure 5:
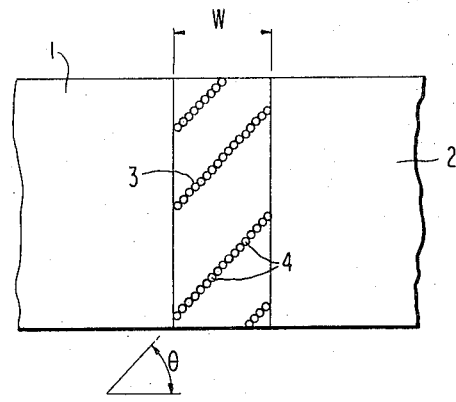

In the example shown in FIG. 5, the connection ends of metallic strips 1 and 2 each having an edge perpendicular to the longitudinal direction of the metallic strip are piled or overlapped on each other with a width of the piled portion within the scope of this invention and several weld portions 3 are formed thereon, having a weld line angle ($\theta$) to the longitudinal direction of the metallic strip, by a seam welding method.

The angle of the connected portion of this invention is the angle formed between the weld line, i.e., a line connecting the weld spots, and the longitudinal direction of the metallic strip and the angle need not always coincide with the angle of the piled or overlapped portion of the connection ends of metallic strips or the angle formed between the edge of the end of the metallic strip which is joined and the longitudinal direction of the metallic strip. Since in several embodiments of the invention the weld angle will be equal to the angle the connected portion makes with the longitudinal direction of the metallic strip, at times these terms will be used interchangeably, e.g., such would be the case with the embodiment of FIG. 1. It will be clear that for, e.g., the embodiments where a continuous weld is used the weld angle is between the strip edge and the weld per se, whereas in those embodiments where a discontinuous weld is used it will be necessary to "artificially" connect the weld points to derive a weld angle. While a number of weld lines having different weld angles within the present invention could be used, such is not economically feasible or necessary.

Figure 2:
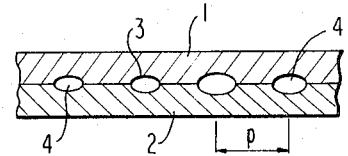
FIG. 2 is an enlarged cross sectional view taken along line X—X of FIG. 1.

Also, as shown in FIG. 2, the weld portion 3 by a resistance welding method is formed by welding the contact surface of the piled or overlapped portions of the metallic strips 1 and 2 and the weld points 4 are formed with a interval ($p$) in a spot welding method.

However, the weld is continuous in a seam welding method, i.e., the present invention includes embodiments where the interval ($p$) is zero. For example, in the connected portion formed by welding the contact ends of the metallic strips by a foil seam welding method as shown in FIG. 3 more excellent bond strength is obtained when the weld angle of the connected portion is in a range of about 40° – 70°.

As a general rule, as the interval between the weld points becomes smaller, the bond strength of the connected portion tends to become higher.

The laminated tape for shielding cable of this invention is obtained by coating one or both surfaces of the metallic strips having the thus formed connected portion or portions with a polymer having a good adhesive property to the metallic strip and a polymer jacket covering. Examples of such polymers with good adhesive properties are polyethylene, and other polyolefins, polyethylene copolymers such as ethylene-acrylic acid copolymers, ethylene-lower vinyl ester, e.g., vinyl acetate copolymers, etc., ionomers such as Surlyn A (du Pont) and the like.

Then, conductive cable cores are enfolded with the laminated tape thus obtained. When, in this case, a plastic film is formed on only one side of the metallic strips, the cable cores are folded with the laminated tape so that the plastic film is disposed on the outside. The thickness of the plastic film layer is usually from about 0.02 mm to about 0.2 mm.

Thereafter, a layer of a corrosion resisting polymer is formed thereon as a protective jacket. Polyethylene or a polyethylene copolymer is usually used as the protective jacket. The protective jacket is most preferably formed by an extrusion coating method and the thickness of the jacket layer is ordinarily from about 1.0 mm to about 5.0 mm, preferably from about 1.5 mm to about 3.0 mm.

As the metallic strip in this invention, an aluminum or copper strip is generally used and the thickness thereof is usually from about 0.1 mm to about 0.4 mm, preferably about 0.2 mm.

An example of a particularly preferred laminated shield taple of this invention is a laminated tape prepared by coating on the upper surface of an aluminum strip having a thickness of 0.2 mm a layer of an ethylene-vinyl acetate copolymer containing about 5 – 20 percent by weight vinyl acetate and having a thickness of 25 microns, and coating on the lower surface thereof a layer of Surlyn A (trade name of an ionomer made by du Pont de Nemours Co.). Good results were obtained when the width of the piled portion of the aluminum strips was 5.5 mm, the angle of the connected portion to the longitudinal direction was 65°, and the aluminum strips were connected by seam welding.

The importance of the ranges set for the width (W) of the piled or abutted portion of the connection ends of the metallic strips and the angle of the weld line defined in this invention will be clear from the following tests.

TEST PROCEDURES USED (A) Normal temperature bending property: The test cable is placed perpendicularly between two mandrels having a diameter 12 times the outer diameter of the cable and the cable is slowly bent around the outer surface of one mandrel to 180° and then bent a full 180° around the other mandrel. This motion repeated until cracks form in the metallic tape or strip, and the number of bending cycles (the bending number) is employed as the valve evaluating the bending property thereof.

(B) Rubbing property: The test cable is laid on a rubber roll having a diameter of about 40 mm and the cable is bent at its middle over the diameter of the rubber roll at an angle of 135° between the ends of the cable.

To one end of the cable there is applied a pulling force of 150 Kg and the cable is dragged over the rubber roll one-half of the length thus passes over the roll). The other end of the cable then has a 150 Kg force applied thereto and the cable dragged over the roll in the opposite direction (the whole length thus passes over the roll). Upon returning the cable to the position where its center is on the roll, one bending cycle is completed. The number of bending cycles when cracks appear is used to evaluate the rubbing property.

(C) Low-temperature impact falling property: The test is conducted at −20°C according to the REA standard and the presence of cracks formed in the plastic layer laminated on the metallic strip is observed. The property is evaluated by the ratio of the number of samples having cracks to the total number of samples tested.

(D) Low-temperature impact bending property: The sample cable is bent by impact at an angle of 90° at −30°C and the property is evaluated by the presence of cracks formed in the plastic laminate layer by the test.

(E) Torsional property: One end of the sample cable is fixed so that it moves in the longitudinal direction but does not rotate, the opposite end of the cable is pulled while rotating the end, and the torsional property is evaluated by the state of rupture in the metallic strip.

TEST 1

Test samples as in FIG. 1 having the same dimensions were prepared using laminated tapes composed of aluminum strips 0.2 mm thick connected by various welding methods with a 25 microns thick polyethylene layer coated thereon. Comparision tests were conducted between the connected portions of the metallic strips and portions of the metallic strips other than the connected portions. The weld angle of the connected portion was 75° and the value of (W) was 5 mm. The sample having the connected portion formed by a cold pressing was a conventional product.

The results are shown in the following table.

| Test | Non-welded portions of tape | Seam weld portion | Spot weld portion (p=5 mm) | Spot weld portion (p=10 mm) | Cold pressing |
|---|---|---|---|---|---|
| A | >30 times | 15 | 13 | 7 | 2 |
| B | 45 times | 28 | 25 | 15 | 11 |
| C | 0/20 | 0/20 | 1/20 | 11/20 | 14/20 |
| D | not cracked | not cracked | not cracked | cracked | cracked |

TEST II

Tests of connected portions having various widths (W) of the piled or overlapped portions welded by seam welding at an angle of 75° were conducted with samples having the same structure and dimensions as in Test I. The results are shown in the following table.

| Width (W) (mm) | 12 | 11 | 9 | 8 | 7 | 6 |
|---|---|---|---|---|---|---|
| Test A (times) | 3 | 3 | 8 | 8 | 13 | 13 |
| Test D | cracked | cracked | not cracked | not cracked | not cracked | not cracked |
| Width (W) (mm) | 5 | 4 | 3 | 2 | 1 | 0 |
| Test A (times) | 15 | 15 | 16 | 18 | 18 | 19 |
| Test D | not cracked | not cracked | not cracked | not cracked | not cracked | not cracked |

TEST III

The angle ($\theta$) of the connected portion of the laminated tape was changed, and the tests of the connected portion welded by seam welding along the line of the angle were conducted for test samples having the same structure and dimensions as in Test I. The results are shown in the following table.

| Angle ($\theta$) (degree) | 90 | 80 | 70 | 60 | 50 |
|---|---|---|---|---|---|
| Test A | 3 | 8 | 17 | 18 | 19 |
| Test B | 3 | 18 | 32 | 39 | 40 |
| Test D | cracked | cracked | not cracked | not cracked | not cracked |
| Test E | not cracked | not cracked | not cracked | not cracked | not cracked |
| Angle ($\theta$) (degree) | 40 | 30 | 20 | | |
| Test A | 18 | 7 | 4 | | |
| Test B | 39 | 20 | 18 | | |
| Test D | not cracked | not cracked | not cracked | | |
| Test E | not cracked | cracked | cracked | | |

As is clear from the above-indicated test results, connected portions having a width (W) of the piled portions of metallic strips less than 10 mm, a 30°– 80° weld line angle connected portion and an interval between weld points less than about 5 mm according to the present invention showed excellent properties in a manner similar to the portions of the metallic strips having no connected portions without substantially degrading the mechanical properties of the metallic strips for shielding cables.

Thus, the metallic strips connected according to the present invention can be used as formed, and when the metallic strips are used as a laminated shield tape by coating thereon a plastic film such as polyethylene film, and the latter is used for making laminate sheathed cable, the mechanical properties of the cable are not reduced even if the connected portions of the metallic strips are present in the cable, which renders it possible to easily make laminate sheathed cable having any desired length.

While the invention has been described in detail and with reference to specific embodiments thereof, it will be apparent to one skilled in the art that various changes and modifications can be made therein without departing from the spirit and scope thereof.

What is claimed is:

1. In a laminated tape for shielding cable wherein a protective jacket of a corrosion resisting polymer covers the laminated tape which is folded about conductive cable cores, said laminated tape comprising at least two metallic strips welded in the longitudinal direction of the metallic strips and a plastic film coated on at least one surface of the connected metallic strips the improvement where the welding comprises a series of regularly arranged continuous or discontinuous weld points arranged in a weld line, the width of the portion of the ends of the metallic strips which are connected is from 0 mm to about 10 mm, the interval of the weld points formed in the connected portion by the welding being less than about 5 mm, and the angle of the weld line to the longitudinal direction of the strips being in a range of about 30° to about 80°.

2. The laminated tape for shielding cable as claimed in claim 1 wherein the connected portion of the metallic strips is formed by contacting the edges of the connection ends of the metallic strips to each other and welding them by a foil seam welding method and thus the width of the piled portion of the metallic strips and the interval of the weld points are substantially zero.

3. The laminated tape for shielding cable as claimed in claim 1 wherein the weld angle is from about 40° to about 70°.

4. The laminated tape for shielding cable as claimed in claim 1 wherein the welded portion formed in the connected portion is composed of at least two parallel seam weld lines.

5. The laminated tape for shielding cable as claimed in claim 1 wherein the width of the portions and the interval of the weld points are greater than 0.

6. The laminated tape for shielding cable as claimed in claim 1 wherein the two metallic strips overlap.

7. The laminated tape for shielding cable as claimed in claim 1 wherein the two metallic strips abut.

8. The laminated tape for shielding cable as claimed in claim 1 wherein the weld is a resistance, arc or ultrasonic weld.

9. In a laminate sheathed cable composed of conductive cable cores, laminated metallic tape folding about the cable cores, said tape having coated on one or both surfaces thereof a plastic film, and a protective jacket of a corrosion resisting polymer covering the laminated tape, said metallic tape comprising at least two metallic strips connected by a weld in the longitudinal direction thereof, the improvement where the weld comprises a series of regularly arranged continuous or discontinuous weld points arranged in a weld line, the width of the portion of the ends of the metallic strips which are connected is from 0 mm to about 10 mm, the interval of the weld points formed in the connected portion by the welding being less than about 5 mm, and the angle of the weld line to the longitudinal direction of the strip being in a range of about 30° to about 80°.

10. The laminate sheathed cable as claimed in claim 9 wherein the connected portion of the metallic strips is formed by contacting the edges of the connection ends of the metallic strips to each other and welding them by foil seam welding and thus the width of the piled portion of the metallic strips and the interval of the weld points are substantially zero.

11. The laminate sheathed cable as claimed in claim 9 wherein the weld angle from about 40° t0 about 70°.

12. The laminate sheathed cable as claimed in claim 9 wherein the welded portion is formed by at least two seam weld lines.

13. The laminate sheathed cable as claimed in claim 9 wherein the width of the portions and the interval of the weld points are greater than 0.

14. The laminate sheathed cable as claimed in claim 9 wherein the two metallic strips overlap.

15. The laminate sheathed cable as claimed in claim 9 wherein the two metallic strips abut.

16. The laminate sheathed cable as claimed in claim 9 wherein the weld is a resistance, arc or ultrasonic weld.

* * * * *

UNITED STATES PATENT OFFICE
CERTIFICATE OF CORRECTION

Patent No. 3,829,602           Dated August 13, 1974

Inventor(s) Hisao Ishikawa et al

It is certified that error appears in the above-identified patent and that said Letters Patent are hereby corrected as shown below:

IN THE HEADING:

-Under Inventors, add--Hiroshi Osanai of Tokyo, Japan--

Signed and sealed this 7th day of January 1975.

(SEAL)
Attest:

McCOY M. GIBSON JR.
Attesting Officer

C. MARSHALL DANN
Commissioner of Patents